United States Patent [19]

Yamashita

[11] Patent Number: 4,993,026

[45] Date of Patent: Feb. 12, 1991

[54] MULTIPLEXER APPARATUS WITH AUXILIARY SYNCHRONIZATION FOR COMPENSATING FOR CABLE DELAYS

[75] Inventor: Mikio Yamashita, Tokyo, Japan

[73] Assignee: NEC Corporation, Japan

[21] Appl. No.: 413,333

[22] Filed: Sep. 27, 1989

[30] Foreign Application Priority Data

Sep. 27, 1988 [JP] Japan .................. 63-243682

[51] Int. Cl.$^5$ .............................................. H04J 3/06
[52] U.S. Cl. ............................ 370/100.1; 370/105.1; 370/108
[58] Field of Search ................. 370/112, 100.1, 108, 370/105.1, 105.3; 375/118; 371/1

[56] References Cited

U.S. PATENT DOCUMENTS

| | | | |
|---|---|---|---|
| 4,310,922 | 1/1982 | Lichtenberger et al. | 370/112 |
| 4,426,713 | 1/1984 | Shimizu et al. | 370/108 |
| 4,608,684 | 8/1986 | Upp | 370/100.1 |
| 4,644,536 | 2/1987 | Utsumi | 370/105.1 |
| 4,685,106 | 8/1987 | Miller et al. | 370/112 |
| 4,800,560 | 1/1989 | Aoki et al. | 370/108 |
| 4,829,518 | 5/1989 | Iguchi et al. | 370/112 |

OTHER PUBLICATIONS

"256-Bit Elastic Store CMOS LSI"; Institute of Electronics and Communication Engineers of Japan, Paper of Technical Group on Semiconductors and Semiconductor Devices; vol. 78., No. 276. (Mar. 23, 1979, pp. 13–18).

*Primary Examiner*—Douglas W. Olms
*Assistant Examiner*—Min Jung
*Attorney, Agent, or Firm*—Ostrolenk, Faber, Gerb & Soffen

[57] ABSTRACT

A multiplexer apparatus enables operation in a frame-phase synchronized manner regardless of delays which arise from differences in length of electrical cables that connect respective synchronizers to a multiplexer unit. The multiplexer apparatus comprises a clock supply for supplying a set of timing pulses including reference clock pulses and reference frame pulses; a first synchronizer for receiving lower-order data pulse streams each of which has a predetermined frame beginning with frame timing information and for generating a first set of data pulse streams the frames of which are aligned in phase with each other and synchronized with the reference frame pulses; a delay circuit for delaying the reference frame pulses to produce delayed reference frame pulses; a second synchronizer for receiving the first set of data pulses streams via electrical wirings and for generating a second set of data pulse streams the frames of which are aligned in phase with each other and synchronized with the delayed reference frame pulses. The delay of the delayed reference frame pulses is determined by respective differences in the arrivals of the first set of data pulse streams to the second synchronizer. The apparatus further includes a multiplexing circuit responsive to a second of data pulse streams and synchronized with the reference clock pulses for multiplexing a multiplex higher-order data pulse stream.

5 Claims, 3 Drawing Sheets

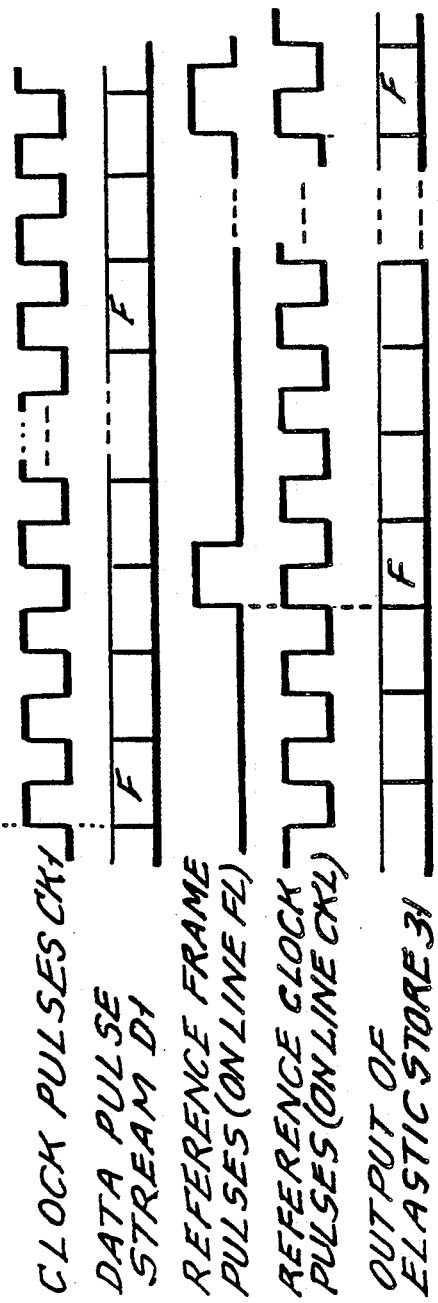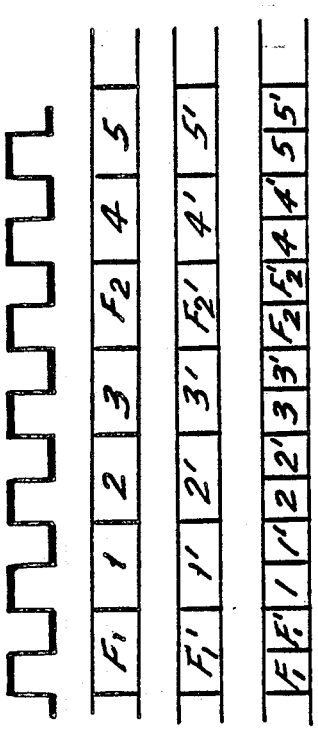

MULTIPLEXER APPARATUS WITH AUXILIARY SYNCHRONIZATION FOR COMPENSATING FOR CABLE DELAYS

BACKGROUND OF THE INVENTION

The present invention relates to a time-division multiplex pulse-code-modulation (PCM) system for use in combining multiple lower-order digital data pulse streams into a single higher-order data pulse stream, and more particularly to a multiplexer apparatus for multiplexing multiple digital data pulse streams whose frames are aligned in phase with each other.

A multiplexer apparatus of this kind includes synchronizers for each channel, which receive data pulse streams having the identical bit rates and aligns the data pulse streams in frame with each other to produce frame-phase synchronized data pulse streams; and a multiplexing unit for multiplexing them into a multiplex data pulse stream. Accordingly, an increased number of channels involves an increased number of synchronizers and makes it difficult to locate each synchronizer under the same electrical conditions with respect to the multiplexing unit. Specifically, when the synchronizers have to be laid out apart from the multiplexing unit in a distributed manner in a housing frame, there are differences in lengths of cables that interconnect each synchronizer with the multiplexing unit. These differences cause differences in time delay. Therefore, such an arrangement involves losses in bit synchronization and frame-phase synchronization among once frame-phase synchronized data streams prior to their arrival to the multiplexing unit. The losses in such synchronizations make the multiplexing unit unable to operate properly manner. These problems become more serious with increased data pulse rate.

SUMMARY OF THE INVENTION

A primary object of the present invention, therefore, is to provide an improved multiplexer apparatus which is operable in a frame-phase synchronized manner regardless of delays due to differences in the lengths of electric cables that connect respective synchronizers to a multiplexing unit.

Another object of the present invention is to provide a multiplexer apparatus which is applicable to higher data pulse rates.

According to the invention, a multiplexer apparatus comprises: clock supply means for supplying a set of timing pulses including reference clock pulses and reference frame pulses; first synchronizer means for receiving lower-order data pulse streams each of which has a predetermined frame beginning with frame timing information and for generating a first set of data pulse streams the frames of which are aligned in phase with each other and timed with the reference frame pulses; delay means for providing a delay to the reference frame pulses to produce delayed reference frame pulses; second synchronizer means for receiving the first set of data pulse streams via electric wirings and for generating a second set of data pulse streams the frames of which are aligned in phase with each other and timed with the delayed reference frame pulses, the delay of the delayed reference frame pulses being determined by respective differences in delay of the arrivals of the first set of data pulse streams to the second synchronizer means; and multiplexing means responsive to a second set of data pulse streams and timed with the reference clock pulses for multiplexing a multiplex higher-order data pulse stream.

In accordance with the specific features of the invention, the first synchronizer means comprises multiple first synchronizing units each corresponding to each channel, and the second synchronizer means comprises multiple second synchronizing units corresponding to the respective first synchronizing units. Each of the first synchronizing units includes a data input means responsive to a predetermined one of the lower-order data pulse streams for extracting a clock timing, frame synchronizing means responsive to the predetermined data pulse stream and to the clock timing for establishing a frame synchronization in the channel to produce frame synchronization pulses at a predetermined period; and elastic store means (i) responsive to the frame synchronization pulses for resetting write addresses, (ii) responsive to the clock pulses for writing data of the predetermined data pulse stream therein, (iii) responsive to the reference frame pulses for resetting read addresses and (iv), responsive to the reference clock pulses for reading the data of the predetermined data pulse stream out of the elastic store means to produce a predetermined one of the first set of data pulse streams.

Since the present invention has additional synchronizer means disposed close to the multiplexing unit, multiplexing operation of the frame-phase synchronized data pulse streams are accomplished even if the respective locations of the data synchronizing units are not equivalent with respect to the multiplexing unit. In addition, the additional synchronizer means are operable with the reference frame and clock pulses and the delayed reference frame pulses and no additional clock extraction circuits and frame synchronization circuits are needed for the additional synchronizer.

BRIEF DESCRIPTION OF THE DRAWINGS

The present invention will be better understood from the following detailed description taken in conjunction with the accompanying drawings, in which:

FIG. 2 is a timing chart showing the operation of the frame aligner of the multiplexer apparatus in FIG. 1;

FIG. 4 is a time chart showing the operation of the multiplexer apparatus in FIG. 3.

DETAILED DESCRIPTION OF THE PREFERRED EMBODIMENT

Figure 1:
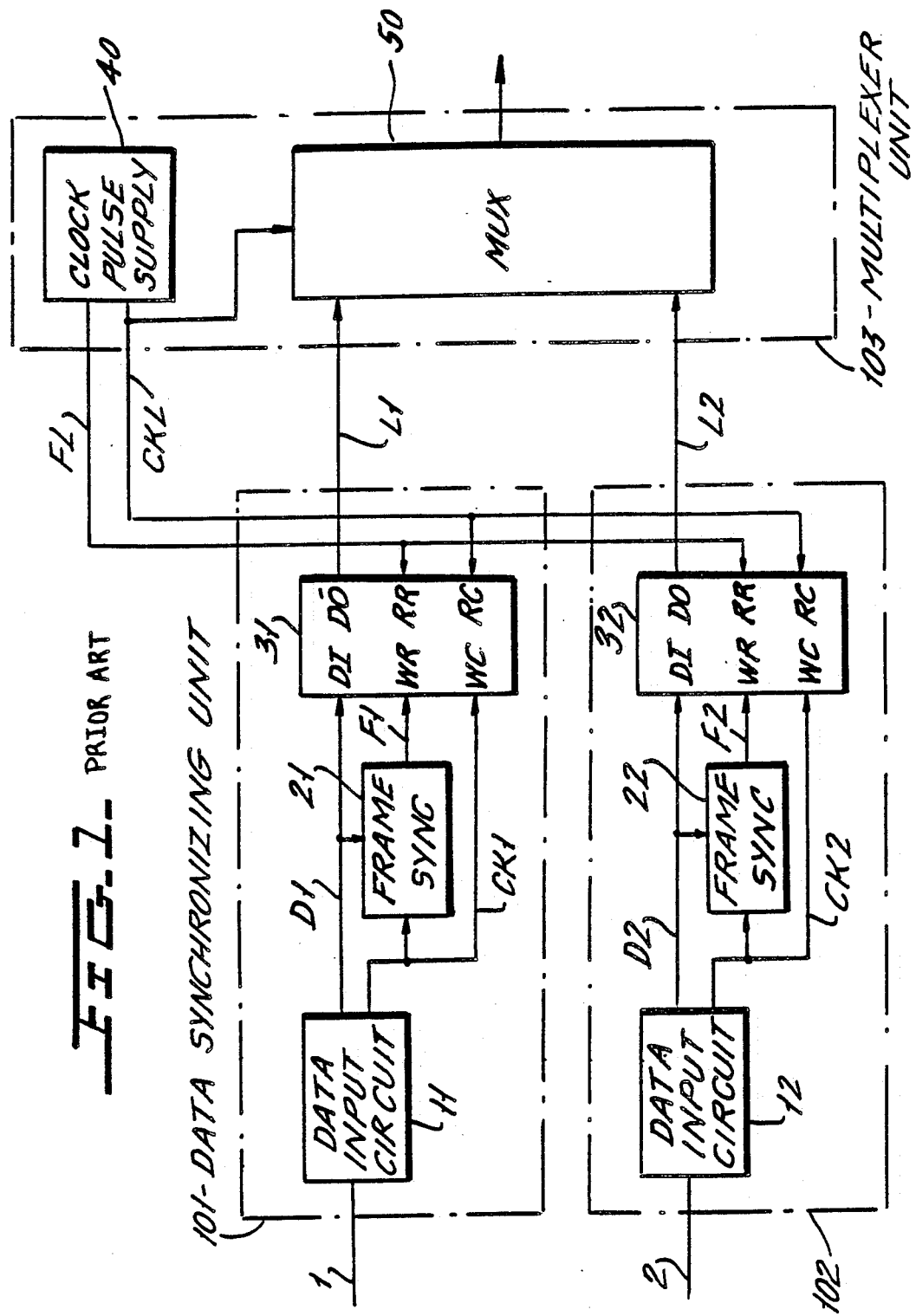
FIG. 1 is a block diagram showing a conventional multiplexer apparatus.

To facilitate understanding of the invention, a conventional multiplexer apparatus will be explained first with reference to FIG. 1. For simplification of illustration, two-channel data pulse streams are assumed for multiplexing. The multiplexer apparatus comprises data synchronizing units 101 and 102 and a multiplexing unit 103 including a multiplexer circuit 50, and a clock pulse supply 40. The clock pulse supply generates a set of timing pulses including reference clock pulses and reference pulses.

The data synchronizing units 101 and 102 respectively comprise data input circuits 11 and 12, frame synchronizing circuits 21 and 22, and frame aligners 31 and 32. The data input circuit 11 extracts clock pulses CK1 from the input data pulse stream of the channel 1, and also outputs a data pulse stream D1 that is synchronous with the clock pulses. A frame synchronizing circuit 21 detects the framing information contained in the data pulse stream D1, establishes a frame synchronization, and outputs a frame synchronization pulse F1 for each frame. The frame aligner 31 is for synchronizing the data pulse stream D1 with the reference frame timing pulse and the reference clock pulses from the clock pulse supply 40, and in which use is made of an elastic store. (Such a frame aligner or an elastic store is disclosed in a paper entitled "256-Bit Elastic Store CMOS LSI". Published by the Institute of Electronics and Communication Engineers of Japan, Paper of Technical Group on Semiconductors and Semiconductor Devices, Vol. 78, No. 276, Mar. 23, 1979, pp. 13–18.) The data pulse stream D1, the frame synchronizing pulse F1 and the clock pulse CK1, are applied to a data input terminal DI, a write reset terminal WR and a write clock terminal WC, respectively, of the elastic store 31. The reference frame pulses and the reference clock pulses are applied via the frame pulse line FL and the clock pulse line CKL, to a read reset terminal RR and a read clock terminal RC, respectively, of the elastic store 31, and an output data pulse stream is output from the elastic store to an electric cable L1 through an output data terminal DO.

Referring to FIG. 2 together with FIG. 1, upon receipt of the frame synchronizing pulse F1, the elastic store 31 resets an internal write-address and starts writing from that moment and running the write address for every clock pulse CK1. Thus the elastic store writes the data of the output pulse stream D1 in synchron with the clock pulses CK1. Data reading starts in response to the reference frame pulse from the line FL, which (i) resets an internal read address, (ii) is synchronized with the reference clock pulses from the line CKL, and (iii) advances in accordance with the order in which the data have been written in. These writing and reading operations are repeated for every frame pulse and reference frame pulse.

Turning back to FIG. 1, the data input, circuit 12 the, frame synchronizing circuit 22, and the frame aligner 32 of data synchronizing unit 102 (i) correspond to those of the data synchronizing unit 101, (ii) operate in a similar fashion with the data pulse stream of channel 2, and (iii) produce as corresponding signals a data pulse stream D2, clock pulses CK2, frame pulses F2, and an output data pulse stream from an elastic store 32. Since the input data pulse streams of channels 1 and 2 have the same frame format and clock rate, the data pulse streams D1 and D2 are bit-synchronized with each other while the output data pulse streams from the frame aligners 31 and 32 are aligned in frame phase as well as in bit phase with each other.

The multiplexer circuit 50 receives from the clock pulse supply 40 switching pulses whose rate is twice as high as that of the reference clock pulses, and multiplexes data pulse streams D1 and D2 reaching it via the electric cables L1 and L2 to produce a higher-order data pulse stream.

However, the conventional multiplexer apparatus, as described above, has a drawback in that proper multiplexing cannot be accomplished due to losses in bit synchronization and frame-phase synchronization in data pulse streams arriving at the multiplexing unit. These losses are caused by different delays due to the lengths of electric cables L1 and L2, which differ depending upon the locations where the synchronizing units are placed. These problems become more serious with increased data pulse rate.

Figure 3:
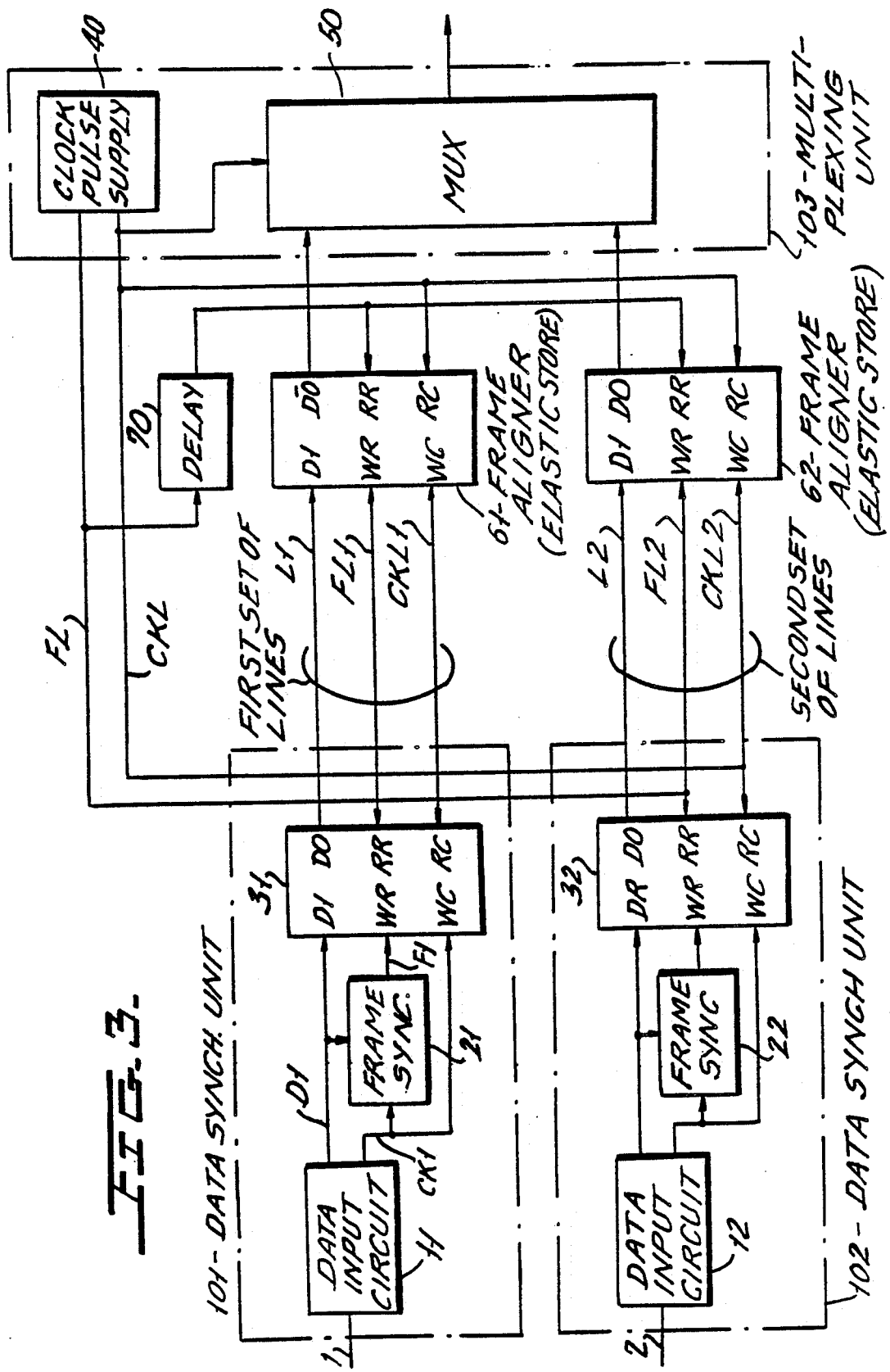
FIG. 3 is a block diagram showing an embodiment of the present invention.

Referring to FIG. 3, a multiplexer apparatus of an embodiment of the present invention is illustrated. The multiplexer apparatus comprises data synchronizing units 101 and 102 for channels 1 and 2, a multiplexing unit 103, additional frame aligners 61 and 62, and a delay circuit 70. The data synchronizing unit, the multiplexing unit including a clock pulse supply 40 and a multiplexing circuit are the same as those of FIG. 1 and are designated by like reference numerals. For simplification of illustration, the description of these components and operation is omitted. Thus, the data synchronizing units 101 and 102 produce frame-phase synchronized data pulse streams on the data output terminals DO of the frame aligners 31 and 32 in synchronism with reference frame pulses and reference clock pulses supplied from the clock pulse supply 40.

This embodiment structurally differs from the prior art shown in FIG. 1 in that the frame aligners 61 and 62, the delay circuit 70, and first and second sets of electric lines are added. The frame aligners 61 and 62 comprise elastic stores. The first set of lines and the elastic store 61 are for channel 1 and have similar structural and functional features with those for channel 2. For the sake of simplification, those for channel 2 are parenthesized below.

The first (second) set of lines comprise a data line L1 (L2), a reference frame line FL1 (FL2) and a reference clock line CKL1 (CKL2) which respectively connect a data output terminal DO of an elastic store 31 (32) and a data input terminal of the elastic store 61 (62), a read reset terminal RR and a write reset terminal WR, and a read clock terminal RC and a write clock terminal WC. Thus, the reference frame pulses and reference clock pulses supplied from the clock supply 40 via the reference frame lines FL and FL1 (FL2) and the reference clock lines CKL and CKL1 (CKL2) are used to reset a write address of a counter (not shown) of the elastic store 31 (32) and to write data therein. The three lines L1, FL1, CKL1 (L2, FL2, CKL2) have substantially the same length, and electrical signals on the lines arrive at the terminals of the elastic store 61 (62) at the same time. Because of substantially the same lengths of the lines FL (FL2) and CKL1 (CKL2), data writing of a data pulse stream on line L1 (L2) begins with framing information of the data pulse stream for channel 1 (2) which consists of succeeding frames each having a predetermined bit length. That is, the framing information of the channel 1 (2) data pulse stream coincides in timing with the reference frame pulses. Since the combination of the first (second) set of lines L1, FL1, and CKL1 (L2, FL2 and CKL2) and the reference frame and clock pulses allows the frames on line L1 (L2) to coincide in phase with the reference frame pulses on line FL1 (FL2), a data input circuit for clock timing extraction and a frame synchronization circuit for frame detection, as used in the data synchronizing unit 101 (102), is unnecessary for the elastic store 61 (62).

It is to be noted that the lengths of the first set of lines, L1, FL1, and CKL1 are not quite equal to those of the second set of lines L2, FL2, and CKL2 while the lines of the same set are set at substantially the same length. These conditions are readily realized even if the data synchronizing units 101 and 102 are placed at any locations in a housing frame.

The conditions mean that although the frame at the data input terminal DI of the elastic store 61 is synchronous in phase with the reference frame pulses at the write reset terminal WR of the elastic store 61 and although the frame phase at the data input terminal DI of the elastic store 62 is in synchronism with the reference frame pulses at the write reset terminal WR of the elastic store 62, the frame phase at the data input terminal DI of the elastic store 61 is not always synchronous with the frame phase at the data input terminal DI of the elastic store 62.

Thus, data of the data pulse stream on line L1 (L2) is written in synchronism with reference clock pulses on line CKL1 (CKL2). The data writing starts with the arrival of a reference frame pulse on line FL1 (FL2).

Read clock terminals RC of the elastic stores 61 and 62 are fed with the reference clock pulses from the clock pulse supply 40 while read reset terminals RC of the elastic stores 61 and 62 are supplied with delayed reference frame pulses which have a time delay with respect to the reference frame pulses and are generated by the delay circuit 70. The time delay is determined based on the lengths of the first and second sets of lines, those of the reference frame and clock lines FL and CKL, and jitter. However, the primary purpose of the delay circuit is to give such a delay that a read operation follows a write operation of the elastic stores 61 and 62.

In response to the delayed reference pulses, read addresses of the elastic stores 61 and 62 are reset and data reading from the stores 61 and 62 starts upon receipt of the reference clock pulses. Thus, data pulse streams from the terminal DO of the elastic stores 61 and 62 are aligned in frame phase with each other as well as they are bit-synchronized.

Referring to FIG. 4 together with FIG. 3, the multiplexing circuit 50 multiplexes the two frame-phase synchronized data pulse streams from the elastic stores 61 and 62 into a higher order data pulse stream under the control of the clock pulse supply 40.

In the above embodiment, the elastic stores 61 and 62 may be small in memory capacity because it is determined by the difference between the arrival time of the reference frame pulse at the write reset terminal of the elastic store 61 and that of the reference frame pulse at the write reset terminal of the elastic store 62.

It is to be understood that the embodiment described herein is merely illustrative of the principles of the invention. Various modifications thereto may be effected by persons skilled in the art without departing from the spirit and scope of the invention. For example, the invention may be applied to more than two channels simply by adding corresponding components. Furthermore, the elastic stores 61 and 62 and the delay circuit 70 may be incorporated into the multiplexing unit instead of placing them close to the multiplexing unit. This incorporation is permissible because the elastic stores 61 and 62 and the delay circuit 70 are small in size as compared with the data synchronizing units 101 and 102.

What is claimed is:

1. A multiplexer apparatus for time division digital combining transmission, comprising:
    clock supply means for supplying a set of timing pulses including reference clock pulses and reference frame pulses;
    first synchronizer means for receiving a plurality of lower-order data pulse streams each of which is assigned to and has a predetermined frame beginning with frame timing information, and for generating a first set of data pulse streams the frames of which are aligned in phase with each other and synchronized with the reference frame pulses;
    delay means for providing a delay to the reference frame pulses to produce delayed reference frame pulses;
    second synchronizer means for receiving the first set of data pulse streams via electric wirings and for generating a second set of data pulse streams the frames of which are aligned in phase with each other and synchronized with the delayed reference frame pulses, the delay of the delayed reference frame pulses being determined by respective differences in delay of the arrival of the first set of data pulse streams to said second synchronizer means; and
    multiplexing means responsive to the second set of data pulse streams for multiplexing a multiplex higher-order pulse stream, the second synchronizer means being disposed closer to the multiplexing means, compared to the first synchronizer means.

2. A multiplexer apparatus as set forth in claim 1, wherein the first synchronizer means comprises multiple first synchronizing units each corresponding to each channel and the second synchronizer means comprises multiple second synchronizing units corresponding to the respective first synchronizing units.

3. A multiplexer apparatus as set forth in claim 2, wherein the second synchronizing units, the delay means, and the multiplexing means are housed in a single unit.

4. A multiplexer apparatus as set forth in claim 3, wherein each of the second synchronizing units comprises elastic store means that are (i) responsive to the reference frame pulses for resetting write addresses responsive to the reference clock pulses for writing data of the predetermined data pulse stream of the first set of data pulse stream, (ii) responsive to the delayed reference frame pulses for resetting read address, and (iii) responsive to the reference clock pulses for reading the data out of the elastic store means to produce a predetermined one of the second set of data pulse streams.

5. A multiplexer apparatus as set forth in claim 4, wherein each of the first synchronizing units includes:
    a data input means responsive to a predetermined one of the lower-order data pulse streams for extracting a clock timing signal;
    frame synchronizing means responsive to the predetermined data pulse stream and the clock timing signal for establishing a frame synchronization in the channel to produce frame synchronization pulses at a predetermined period; and
    elastic store means that are (i) responsive to the frame synchronization pulses for resetting write addresses, (ii) responsive to the clock pulses for writing data of the predetermined data pulse stream therein, (iii) responsive to the reference frame pulses for resetting read addresses, and (iv) responsive to the reference clock pulses for reading the data of the predetermined data pulse stream out of the elastic store means to produce a predetermined one of the first set of data pulse streams.

* * * * *